(12) United States Patent
DeRosa et al.

(10) Patent No.: US 6,415,075 B1
(45) Date of Patent: Jul. 2, 2002

(54) PHOTOTHERMAL OPTICAL SIGNAL LIMITER

(75) Inventors: Michael E. DeRosa, Painted Post; Stephen J. Caracci, Elmira; Dana C. Bookbinder, Corning; Thomas M. Leslie, Horseheads; Stephan L. Logunov, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 33 days.

(21) Appl. No.: 09/741,945

(22) Filed: Dec. 20, 2000

(51) Int. Cl.$^7$ .............................. G02B 6/26; G02B 6/42
(52) U.S. Cl. ......................... 385/27; 385/31; 385/140; 385/141; 385/70; 385/43; 385/51; 385/52; 385/80; 385/97; 385/98; 385/99; 385/93; 385/75; 359/127; 359/138; 359/193; 359/195
(58) Field of Search ........................... 385/27, 31, 140, 385/141, 70, 43, 51, 52, 80, 97, 98, 99, 73, 75; 359/127, 138, 193, 195

(56) References Cited

U.S. PATENT DOCUMENTS

| | | | |
|---|---|---|---|
| 4,890,075 A | | 12/1989 | Pohlmann et al. ........... 330/4.3 |
| 5,172,278 A | * | 12/1992 | Tutt ............................. 359/885 |
| 5,287,424 A | | 2/1994 | Sheem et al. .................. 385/39 |
| 5,741,442 A | | 4/1998 | McBranch et al. .......... 252/582 |
| 6,278,821 B1 | * | 8/2001 | Carberry et al. .............. 385/39 |
| 2001/0021292 A1 | * | 9/2001 | Merkel ......................... 385/37 |

FOREIGN PATENT DOCUMENTS

EP      0 943 954 A2     9/1999       385/2

* cited by examiner

*Primary Examiner*—Brian Healy
*Assistant Examiner*—Sarah Woo
(74) *Attorney, Agent, or Firm*—Svetlana Short

(57) ABSTRACT

An optical signal limiter is provided for limiting transmission of a continuous wave optical signal that exceeds a preselected threshold power level. The limiter includes a body having input and output ends that is formed at least in part from a material having a negative thermal index coefficient of between about $-0.5 \times 10^{-4}$ °C.$^{-1}$ and $-4.0 \times 10^{-4}$ °C.$^{-1}$ and an absorption coefficient of between 1.0 to 5.0 dB/cm at wavelengths between 980–1650 nm. The limiter also includes collimating fibers mounted on the input and output ends to minimize low power signal losses across the limiter body. It may be installed at a junction between two optical fibers and is preferably formed from a curable adhesive having the aforementioned negative thermal index coefficient to obviate the need for separate bonding materials and joining steps during the installation of the limiter. The optical limiter is reusable and with a recovery time of 1–5 milliseconds advantageously prevents power surges in optical circuits from damaging sensitive optical components by limiting the amplitude of such surges within 0.2–0.5 milliseconds.

30 Claims, 4 Drawing Sheets

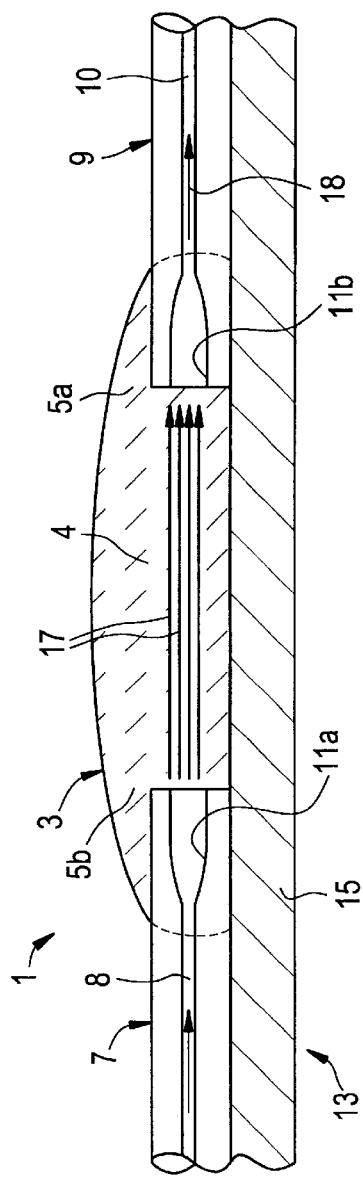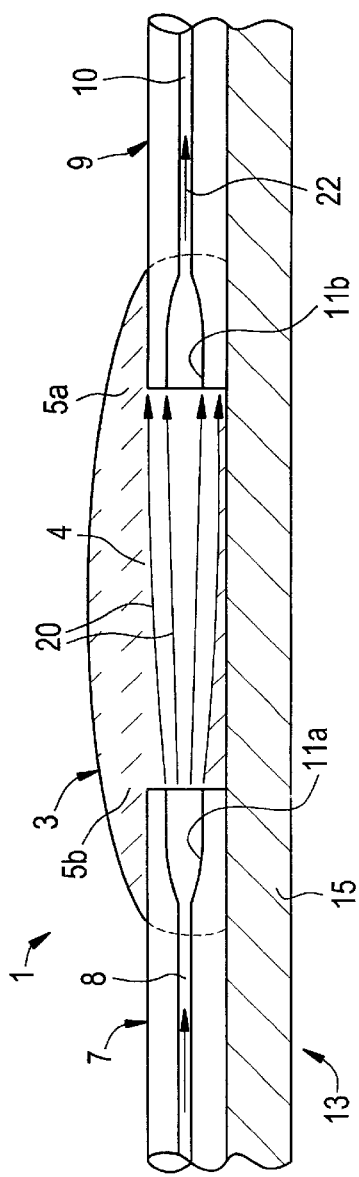

PHOTOTHERMAL OPTICAL SIGNAL LIMITER

FIELD OF THE INVENTION

This invention generally relates to devices for limiting optical surges, and is specifically concerned with a photothermal signal limiter for limiting an optical continuous wave transmission that exceeds a preselected threshold power level.

BACKGROUND OF THE INVENTION

Devices for limiting optical surges are known in the prior art. For example, optical fuses are known for preventing the transmission of a potentially damaging optical power surge through a photonic circuit. Such a power surge may be caused, for example, by the creation of a spurious amplitude spike at the interface between the input of an optical amplifier and a photonic channel multiplexer. The amplified spike creates a surge that can permanently damage one or more of the optical components of the amplifier itself, thereby rendering it inoperable. Such surges also have the potential of damaging other optical components downstream of the surge-originating amplifier.

To prevent such damage, it is known to place an optical fuse in the amplifier circuit that will break the circuit upon receipt of a power pulse above a certain threshold power level to thereby protect all of the downstream optical components. Such an optical fuse is disclosed in European Patent No. 943954, and generally comprises a light-absorbing metal (such as finely powdered aluminum, palladium, cobalt, etc.) embedded within a light conductive matrix of silicon dioxide or organic dielectric. In operation, when a surge is transmitted through the fuse, the heat generated by the absorption of the surge by the metal degrades or destroys the surrounding matrix, thus breaking the light conducting path through the optical fibers.

Other types of optical surge limiters are known wherein a material having non-linear optical absorption properties is encased within a light conductive material such as glass or a transparent polymer. Such limiters are designed to protect optical devices used in certain military applications from damage from high energy laser pulses. Examples of such limiters are present in U.S. Pat. Nos. 4,890,075 and 5,741,442, and may comprise a glass cell filled with a liquid solution of a dye having the designated non-linear optical absorption properties.

While both of the previously discussed prior art devices are capable of limiting optical power surges, both have shortcomings when applied to fiber optic circuitry. For example, once an optical fuse is "tripped," it must be replaced since the glass or polymer matrix forming the body of the fuse is destroyed or degraded incident to the performance of its protective function. And while many of the surge limiting devices employing non-linear optical absorption materials are self-healing and reusable, they are not designed to effectively attenuate a power surge of relatively moderate proportions occurring over a continuous wave optical transmission. By continuous wave optical transmission is modulated optical power which has continuous average power over a time scale significantly longer than the communication frequency. By contrast, they can only be actuated by very high amplitude, short duration (i.e. 10 nanoseconds) bursts of laser light. Moreover, they often employ exotic and relatively expensive materials (such as fullerenes modified to have side chains) and require structural components (such as liquid or gel-containing cells formed from glass, quartz, or sapphire) which are difficult to fabricate on the small scales necessary to join optical fibers together, and which require separate joining structures when installed between two optical fibers.

Clearly, there is a need for an optical signal limiter that is reusable, and effective to limit power surges transmitted over continuous wave optical signals. Such a limiter should be easy to mass produce on the small scales used in fiber optic circuits, and formable from relatively inexpensive materials. Finally, it would be desirable if the structure of the surge suppressor were capable of inherently forming a joint or junction between two optical fibers when installed without the need for a separate joining structure or separate joining steps.

SUMMARY OF THE INVENTION

According to one aspect of the present invention, the optical signal limiter comprises a limiter body formed at least in part of a material having a negative thermal index coefficient.

In the preferred embodiment, this coefficient is between about $-0.5\times10^{-4}$ $°C.^{-1}$ and $-4.0\times10^{-4}$ $°C.^{-1}$ for an optical signal having a wavelength between about 1400 and 1700 nm. Additionally, the material forming the limiter body has an absorption coefficient of between about 1.0 to 5.0 dB/cm. The limiter body includes input and output ends for receiving and transmitting an optical signal, respectively. The distance between the input and output ends is preferably between about 50 and 1500 microns, and more preferably between 100 and 1000 microns.

The material forming the limiter body is preferably a polymer with adhesive characteristics capable of inherently forming a bond or splice between optical fibers when installed between two fiber ends. The polymer preferably has rubbery or gel-like mechanical properties at the operating temperature of interest. The polymeric material may be ultraviolet curable to facilitate the manufacturing process. Examples include epoxies, acrylates, urethane acrylates, or thiol-ene polymers. Two-part thermally curable or room curable polymers such as epoxy-amine adhesives may also be used. A dopant may be intermixed with the epoxy polymer in order to enhance absorption of the optical limiter in the telecommunication wavelength region (980–1620 nm). In the preferred embodiment, such dopants include rare earth organic complexes.

The signal limiter may also include a pair of first and second collimating fibers to minimize signal loss across the distance between the input and output ends of the body of the limiter. Each collimating fiber includes an end optically connected to an optical fiber, and an opposite end optically connected to one of the input and output ends of the body of the limiter. The collimating fibers may be either a gradient refractive index lens or a thermally expanded core collimating lens. An alignment means such as a fiber gripper, V-groove, or microcapillary tubes may be used to align the cores of the first and second collimating fibers across the gap occupied by the limiter body.

The specific photothermal attenuation properties of the resulting limiter may be conveniently selected by adjusting (1) the negative thermal index coefficient of the material by lowering the glass transition temperature of the limiter body to a value below the environmental temperature the limiter will be operating in, (2) adjusting the length of the gap between the collimating fibers that is filled by the limiter body, and/or (3) adjusting the absorption coefficient of the limiter body by selecting a polymer material with greater or lesser absorption characteristics and/or adding a dopant that will enhance the absorption characteristics. Forming the body of the limiter from a curable epoxy polymer advantageously obviates the need for separate joining materials or a separate joining step during the manufacture and installation of the limiter in an optical circuit.

BRIEF DESCRIPTION OF THE DRAWINGS

FIGS. 2A and 2B are cross-sectional side views of the optical signal limiter of FIG. 1 along the line 2—2, illustrating the operation of the device in the normal mode and in the surge mode, respectively;

DETAILED DESCRIPTION OF THE INVENTION

Figure 1:
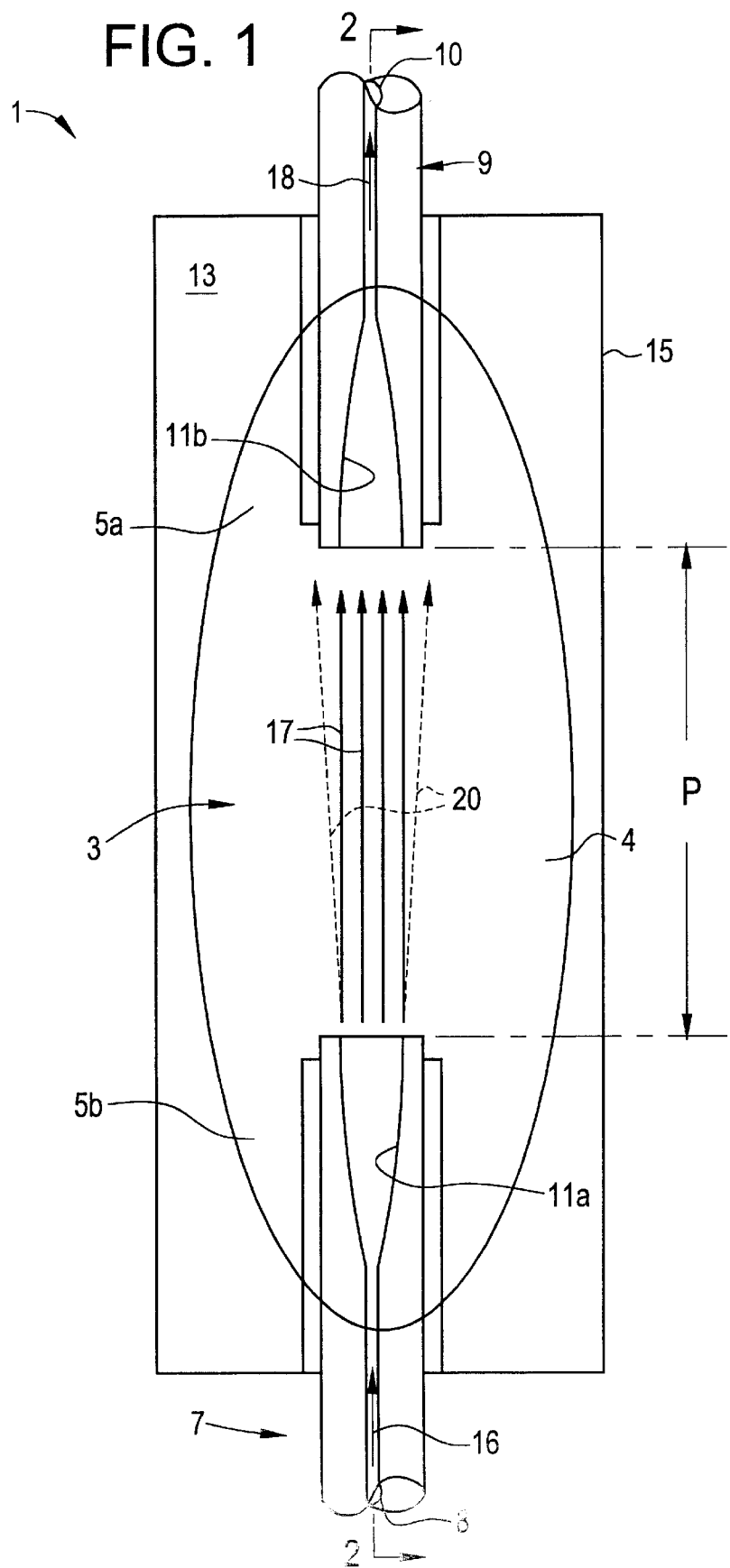
FIG. 1 is a plan view of the photothermal optical signal limiter of the invention.

With reference now to FIGS. 1, 2A and 2B, wherein like numerals designate like components throughout all of the several Figures, the optical signal limiter 1 of the invention generally comprises a limiter body 3 having a centrally disposed light-conductive portion 4 that terminates in input and output ends 5a, 5b. Input and output ends 5a, 5b overlap and encase the terminal ends of a transmitting optical fiber 7 and a receiving optical fiber 9 as shown. Each of the optical fibers 7, 9 includes a light-conducting core portions 8, 10 respectively. Both the transmitting and receiving optical fibers 7, 9 terminate in collimating lens 11a, 11b, respectively.

The collimating lenses 11a, 11b of the transmitting and receiving optical fibers 7 and 9 are axially aligned by means of a fiber aligner 13 having a substrate 15. In the preferred embodiment, the fiber aligner 13 may be a fiber gripper. Alternatively, the aligner 13 may be a V-shaped or U-shaped groove in the substrate 15, or even microcapillary holders on such a substrate.

The limiter body 3 is formed from a light-conducting material having a negative thermal index coefficient. In the preferred embodiment, the material forming the limiter body 3 has a negative thermal index coefficient of between about $-0.5 \times 10^{-4}$ °C.$^{-1}$ and $-4.0 \times 10^{-4}$ °C.$^{-1}$ for an optical signal having a wavelength of between about 1400 and 1700 nm. Additionally, the material forming the limiter body 3 has a light absorption coefficient of between about 1.0 to 5.0 dB/cm.

To facilitate the fabrication process, the limiter body 3 is preferably formed from a polymer having adhesive characteristics that is capable of inherently forming a bond or splice between the ends of the transmitting and receiving optical fibers 7 and 9. Such polymers include epoxies, acrylates, urethane acrylates, and thiol-ene systems. Each of these particular classes of polymers are advantageously ultraviolet curable. The most ideal polymers for use as the limiter body 3 are ones that have a high hydrocarbon content (i.e., a relatively large number of C—H bonds) and have rubbery or gel-like mechanical properties at the operating temperature of interest. There are two reasons for this. First, C—H bonds have vibrational characteristics that absorb in the telecommunication wavelength range of interest and hence promote the thermal optic effect responsible for the operation of the optical signal limiter 1 of the invention. Second, the value of dn/dT in organic materials is dominated by volume changes with temperature. Therefore, soft polymers expand more with temperature and thus have larger dn/dT values than hard glassy polymers. Polymers having all of the aforementioned bonding properties and high hydrocarbon content include Master Bond UV 15-7 manufactured Master Bond, Inc., located in Hackensack, N.J.; Norland Optical Adhesives Nos. NOA60, NOA61, NOA68, NOA81, NOA88, and NOA73, all of which are manufactured by Norland Products, Inc., located in New Brunswick, N.J., and Lensbond VTC-2, P92 manufactured by Summers Optical Adhesives located in Fort Washington, Pa. All of the above-listed adhesive polymers are ultraviolet curable. However, other types of adhesive polymers may advantageously be used as well. Examples include product Nos. OC-431-LVP and OCK-1433, both of which are manufactured by Nye Lubricants, Inc., located in New Bedford, Mass., as well as a two-part optical epoxy adhesive sold as product No. EPO-TEK 310 by Epoxy Technology, Inc., located in Billerica, Mass.

In cases where the mechanical and adhesive properties of a candidate polymer for use as the limiter body 3 are optimum, but the absorption coefficient is lower than desired, a dopant could be added to the polymer to increase the absorption coefficient. Dopants that could be incorporated into the polymer materials before curing in order to enhance absorption in the wavelength range of between 980–1600 nm are rare earth organic complexes. Examples of such rare earth organic complexes include: erbium tris[3-(heptafluoropropylhydroxymethylene)-(+)-camphorate; erbium tris (2,2,6,6-tetramethyl-3,5-heptanedionate); erbium tris(6,6,7,7,8,8-heptafluoro-2,2 dimethyl-3,5-octaneiodionate; erbium tris[3-(trifluoromethylhydroxymethylene)-(+)-camphorate; praseodymium tris[3-(heptafluoropropylhydroxymethylene)-(+)-camphorate; praseodymium tris[3-(trifluoromethylhydroxymethylene)-(+)-camphorate, and praseodymium tris (2,2,6,6-tetramethyl-3,5-heptanedionate).

With reference to FIGS. 1, 2A and 2B, the transmitting and receiving optical fibers 7, 9 terminate in a collimating fiber having a collimating lens 11a, 11b. This may be accomplished by terminating the fibers 7, 9 with a collimating fiber gradient refractive index (GRIN) lens. Alternatively, the transmitting and receiving fibers 7, 9 may be terminated with a thermally expanded core (TEC) collimating lens. Regardless of what particular optical mechanism is used to achieve collimation in the gap between the ends of the transmitting and receiving optical fibers 7, 9, the ends of these fibers must be accurately aligned by way of a fiber aligner 13 in order to minimize losses during transmission. Fabrication of the optical limiter is easily accomplished upon proper alignment of the transmitting and receiving optical fibers 7, 9 by merely applying one of the previously mentioned adhesive polymers in liquid or gel form across the gap separating the ends of the fibers and either letting the polymer harden or inducing such hardening by ultraviolet curing.

Figure 3:
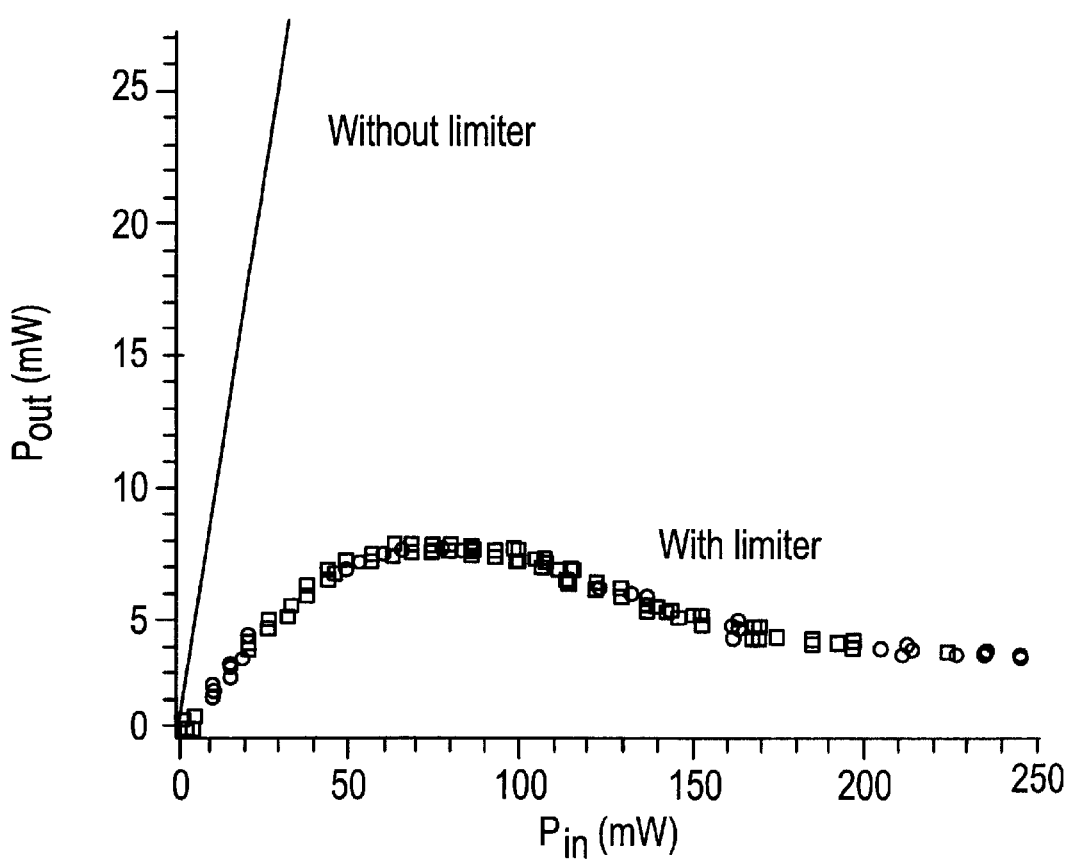
FIG. 3 is a graph illustrating the power output of an optical fiber experiencing a surge both with and without the optical signal limiter of the invention.

With reference again to FIGS. 1, 2A, and 2B, the mechanism exploited by the resulting optical signal limiter 1 is photothermal defocusing. When a continuous input signal 16 of less than about 50 mW is directed through the transmitting optical fiber 7, the resulting light rays are collimated as specifically shown in FIG. 2A. These collimated light rays 17 are received by the collimating lens 11b of the receiving optical fiber 9 with little or no loss as the index of refraction of the light conductive portion 4 of the limiter body 3 remains substantially the same as the index of refraction of the fibers 7, 9. A full strength output signal 18 is transmitted to the receiving optical fiber 9. However, as is indicated both in FIGS. 2B and 3, substantial attenuation begins to occur when the continuous wave signal surpasses 50 mW. Under such circumstances, the heat generated by the light beams 20 heat the light conductive portion 4 of the limiter body 3 to a point wherein the index of refraction of the limiter body 3 is substantially decreased. This decrease in the refractive index causes the light rays 20 to fan out in a defocused pattern wherein only some of these light rays is received by the collimating lens 11b of the receiving fiber 9. If a power surge increases beyond 50 watts, the defocusing of the light conductive portion 4 of the limiter body 3 likewise increases such that a maximum of only about 80 mW of power is ever conducted from the transmitting optical fiber 7 to the receiving optical fiber 9. Further increases in the amplitude of a surge result in even less power being transmitted between the two fibers, as is indicated in FIG. 3. In all such cases, an attenuated output signal 22 is transmitted to the receiving optical fiber 9.

Figure 4:
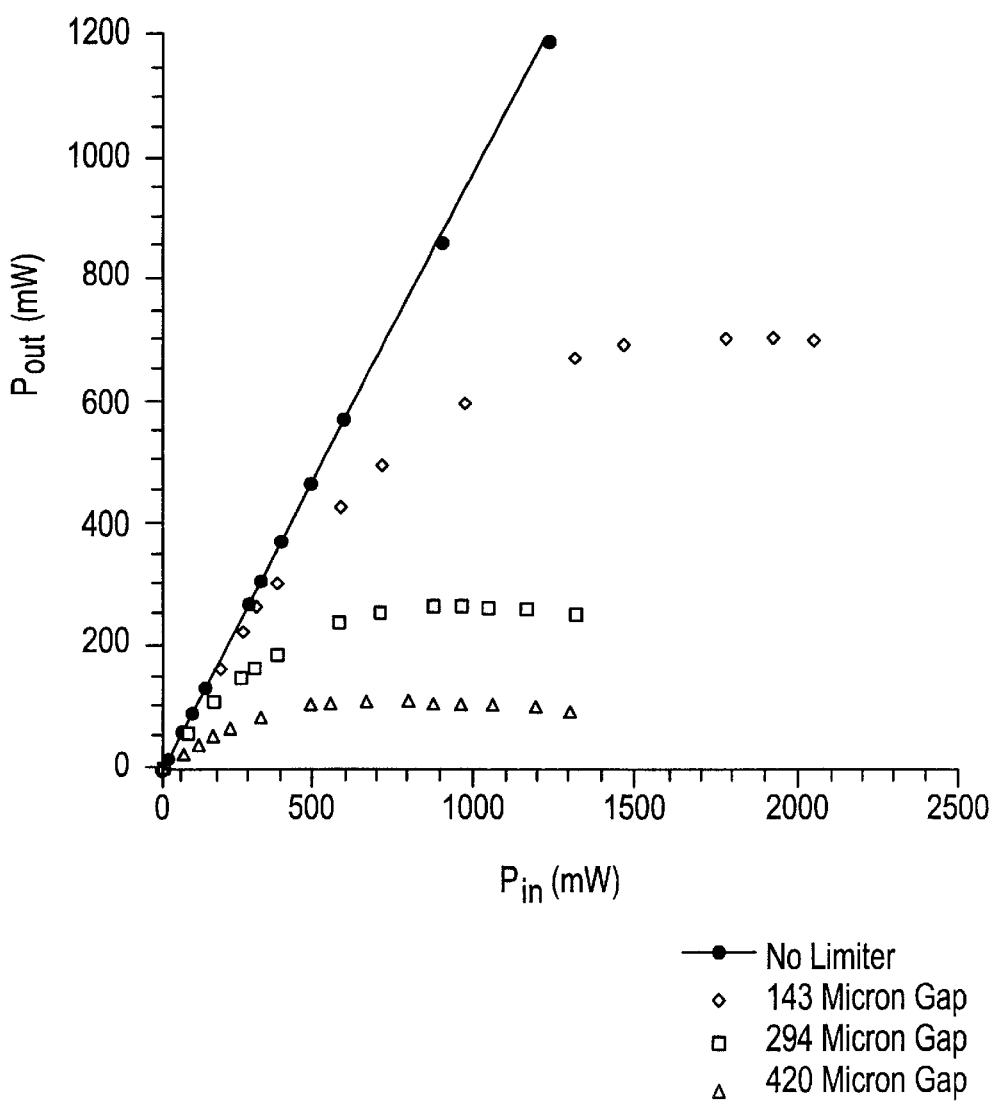
FIG. 4 is a graph illustrating how the signal limiter of the invention attenuates an optical power surge for different gap distances between the transmitting and receiving ends of optical fibers over which the signal limiter is mounted.

The specific photothermal attenuation properties of the resulting limiter 1 may be conveniently selected by adjusting (1) the negative thermal index coefficient of the material by lowering the glass transition temperature of the limiter body to a value below the environmental temperature the limiter will be operating in, (2) adjusting the absorption coefficient of the limiter body by selecting a polymer material with greater or lesser absorption characteristics and/or adding a dopant that will enhance the absorption characteristics, and (3) adjusting the length of the gap P between the collimating fibers 7, 9 that is filled by the limiter body 3. The technique of lowering the glass transition temperature $T_g$ of the limiter body 3 increases the rate at which the limiter body 3 expands as a function of temperature. In essence this means that lowering the $T_g$ maximizes dn/dt, i.e., the negative thermal index coefficient. This can be accomplished by the addition of a number of well known softening composition to the polymeric material forming the limiter body 3, or by adjusting the curing parameters of the polymer. The second technique may be implemented by the addition of the rare earth organic complexes previously listed. The effect of the third technique of adjusting the gap length is illustrated in the graph of FIG. 4. Here, the power attenuation characteristics of an optical signal limiter 1 fabricated in accordance with the invention is compared for gaps of 143 microns, 294 microns, and 420 microns, respectively. The use of a 420 micron gap attenuates the power output of the limiter 1 to approximately 100 mW. The use of a 294 micron gap results in an attenuation of about 300 mW, while the use of a 143 micron gap attenuates the signal at a much higher level of about 700 mW.

The optical limiter 1 limits the amplitude of power surges occurring over a continuous wave signal within 0.2 to 0.5 milliseconds. Additionally, the limiter 1 is advantageously reusable with a recovery time of between 1–5 milliseconds.

While the optical limiter 1 of the invention has been described with respect to only a relatively few examples, it will become apparent to persons of skill in the art that different materials other than the ones listed may be used to obtain the same result. Additionally, different mechanical coupling or splicing techniques might be used in addition to the ones specifically illustrated. All such variations, modifications, and additions to the invention are intended to be encompassed within the scope of this application, which is limited only by the claims appended hereto and their various equivalents.

PARTS LIST

1. Optical signal limiter
3. Limiter body
4. Centrally disposed light conductive portion
5. Input/Output ends a, b
7. Transmitting optical fiber
8. Light conducting core
9. Receiving optical fiber
10. Light conducting core
11. Collimating lens a, b
13. Fiber aligner
15. Substrate
16. Input signal
17. Collimated light rays
18. Full strength output signal
20. Defocused light rays
22. Attenuated output signal

What is claimed is:

1. An optical signal limiter for limiting transmission of an optical signal that exceeds a preselected threshold power level, comprising:
   a limiter body formed at least in part from a material having a negative thermal refractive index coefficient.

2. The optical signal limiter described in claim 1, wherein said negative thermal refractive index coefficient is between about $-0.5 \times 10^{-4}$ °C.$^{-1}$ and $-4.0 \times 10^{-4}$ °C.$^{-1}$.

3. The optical signal limiter described in claim 2, wherein said negative thermal refractive index coefficient is between about $-1.0 \times 10^{-4}$ °C.$^{-1}$ and $-3.5 \times 10^{-4}$ °C.$^{-1}$.

4. The optical signal limiter described in claim 1, wherein said limiter body includes input and output ends for receiving and transmitting said optical signal, respectively.

5. The optical signal limiter described in claim 4, wherein distance between said input and output ends is between about 50 and 1500 microns.

6. The optical signal limiter described in claim 5, wherein said distance between said input and output ends is between about 100 and 1000 microns.

7. The optical signal limiter described in claim 1, further comprising first and second collimating fibers connected to said input and output ends of the limiter body for minimizing optical signal loss across the limiter body.

8. The optical signal limiter described in claim 7, wherein said material has a negative thermal refractive index coefficient for an optical signal having a wavelength of between about 980 and 1700 nm.

9. The optical signal limiter described in claim 1, wherein said material of said light conducting portion of said limiter body has an absorption coefficient between about 1.0 to 5.0 dB/cm.

10. The optical signal limiter described in claim 1, wherein said material of said light conducting portion of said limiter body is an organic polymer.

11. A photothermal signal limiter particularly adapted for limiting a continuous wave transmission of an optical signal that exceeds a preselected threshold power level, comprising:
    a limiter body having a light conductive portion for conducting an optical signal and input and output ends on opposite sides of said light conductive portion for receiving and transmitting said optical signal, wherein said light conductive portion is formed at least in part from a material having a negative thermal index coefficient between about $-0.5 \times 10^{-4}$ °C.$^{-1}$ and $-4 \times 10^{-4}$ °C.$^{-1}$.

12. The optical signal limiter described in claim 11, wherein said material of said light conducting portion of said limiter body has an absorption coefficient between about 1.0 to 5.0 dB/cm.

13. The optical signal limiter described in claim 12, wherein said absorption coefficient is between about 1.5 and 4.0 dB/cm at wavelengths between about 980–1650 nm.

14. The optical signal limiter described in claim 11, wherein said limiter body includes input and output ends for receiving and transmitting said optical signal, respectively.

15. The optical signal limiter described in claim 14, wherein distance between said input and output ends is between about 50 and 1500 microns.

16. The optical signal limiter described in claim 15, further comprising first and second collimating fibers connected to said input and output ends of the limiter body for minimizing optical signal loss across the limiter body.

17. The optical signal limiter described in claim 11, wherein said limiter body is an organic polymer.

18. The optical signal limiter described in claim 17, wherein said polymeric material has rubbery or gel-like mechanical properties at ambient temperature.

19. The optical signal limiter described in claim 17, wherein said organic polymer includes a dopant for enhancing an absorption coefficient of said material.

20. The optical signal limiter described in claim 19, wherein said dopant includes a rare earth organic complex.

21. The optical signal limiter described in claim 20, wherein said dopant includes at least one of the group consisting of:

erbium tris[3-(heptafluoropropylhydroxymethylene)-(+)-camphorate;

erbium tris (2,2,6,6-tetramethyl-3,5-heptanedionate);

erbium tris(6,6,7,7,8,8-heptafluoro-2,2 dimethyl-3,5-octaneiodionate;

erbium tris[3-(trifluoromethylhydroxymethylene)-(+)-camphorate;

praseodymium tris[3-(heptafluoropropylhydroxymethylene)-(+)-camphorate;

praseodymium tris[3-(trifluoromethylhydroxymethylene)-(+)-camphorate, and praseodymium tris (2,2,6,6-tetramethyl-3,5-heptanedionate).

22. The optical signal limiter described in claim 17, wherein said polymeric material is one of the group consisting of epoxies, acrylates, urethane acrylates, and thiol-ene and epoxy-amine.

23. The optical signal limiter described in claim 22, wherein said polymeric material is an adhesive curable by ultraviolet light.

24. The signal limiter joint described in claim 16, wherein said collimating fibers includes a gradient refractive index lens.

25. The signal limiter described in claim 16, wherein said collimating fibers includes a thermally expanded core collimating lens.

26. The optical signal limiter described in claim 16, further comprising a means for aligning cores of said first and second collimating fibers.

27. The optical signal limiter described in claim 16, wherein said aligning means is a fiber gripper.

28. A method for joining a pair of optical fibers with an optical signal limiter, comprising the steps of:

(a) aligning ends of said fibers, and (b) forming an optical limiter body and a joint between said fiber ends by applying an adhesive polymeric material between said fiber ends that has a negative thermal index coefficient.

29. The method of joining a pair of optical fibers described in claim 28, wherein photothermal characteristics of said optical signal limiter are adjusted by adjusting at least one of a glass transition temperature of the limiter body, a gap length between fiber ends prior to forming said optical limiter body, and a light absorption coefficient of said optical limiter body.

30. The method of joining a pair of optical fibers described in claim 29, wherein said light absorption coefficient is adjusted by mixing a selected amount of a dopant into said adhesive polymeric material.

* * * * *